(12) United States Patent
Bormann

(10) Patent No.: US 8,820,376 B2
(45) Date of Patent: Sep. 2, 2014

(54) DIAPHRAGM PUMP FOR SELF-INFLATING TIRE

(75) Inventor: Rene Louis Bormann, Moesdorf (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 390 days.

(21) Appl. No.: 13/204,307

(22) Filed: Aug. 5, 2011

(65) Prior Publication Data

US 2013/0032263 A1  Feb. 7, 2013

(51) Int. Cl.
*B60C 23/10* (2006.01)
*B60C 23/12* (2006.01)

(52) U.S. Cl.
CPC ..................................... *B60C 23/12* (2013.01)
USPC ......................................... 152/419; 152/418

(58) Field of Classification Search
USPC ......................... 152/415, 418, 419
See application file for complete search history.

(56) References Cited

U.S. PATENT DOCUMENTS

| 5,707,215 | A | 1/1998 | Olney et al. | |
|---|---|---|---|---|
| 6,533,010 | B1 * | 3/2003 | Alonso et al. | 152/419 |
| 2004/0112495 | A1 | 6/2004 | Weise | |
| 2006/0283534 | A1 | 12/2006 | Hawes | |
| 2008/0308206 | A1 * | 12/2008 | Okada | 152/419 |

FOREIGN PATENT DOCUMENTS

| DE | 102005031099 A1 | 1/2007 |
|---|---|---|
| EP | 1733902 A2 | 12/2006 |
| EP | 1343642 B1 | 6/2009 |

* cited by examiner

*Primary Examiner* — Jason Bellinger
(74) *Attorney, Agent, or Firm* — June E. Rickey

(57) ABSTRACT

A diaphragm pump for use in a self-inflating tire assembly is disclosed. The assembly includes a tire mounted to a rim tire mounting surface. The tire has an internal cavity. The invention further includes a pump device mounted to the rim, and the pump device has a first end and a second end, the first end being mounted within the tire cavity and the second end located outside the rim and in fluid communication with the outside air. The first end of the pump device has a flexible member having an outer rim and an inner rim, wherein the outer rim is connected to a backing plate and an inner rim is connected to a piston, wherein the piston is slidably mounted within a chamber of the backing plate. The piston has an inner passageway for fluid communication with the tire cavity and the chamber, and the second end of the pump device has an internal bore in fluid communication with the outside air and the chamber.

13 Claims, 6 Drawing Sheets

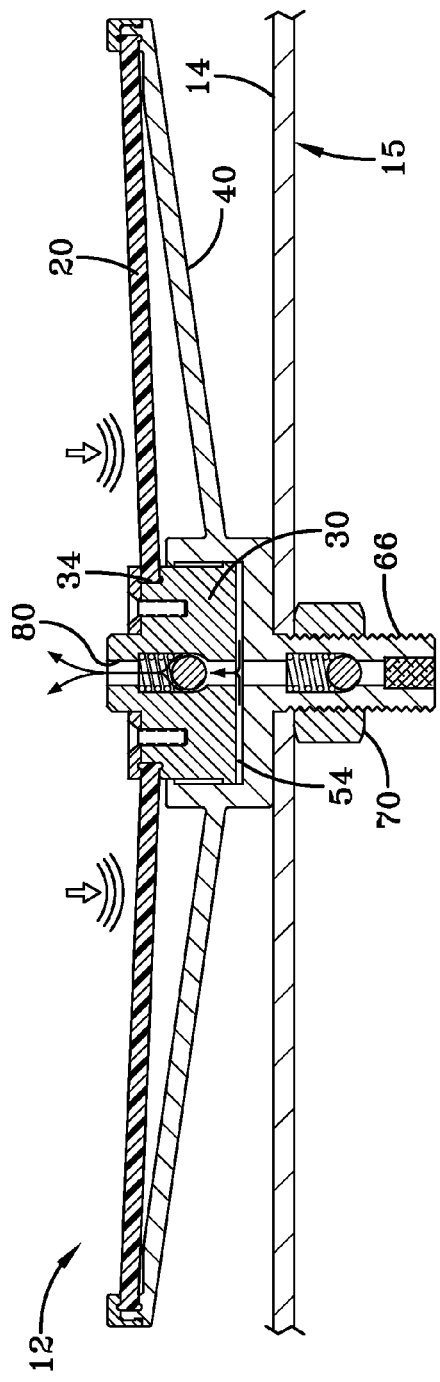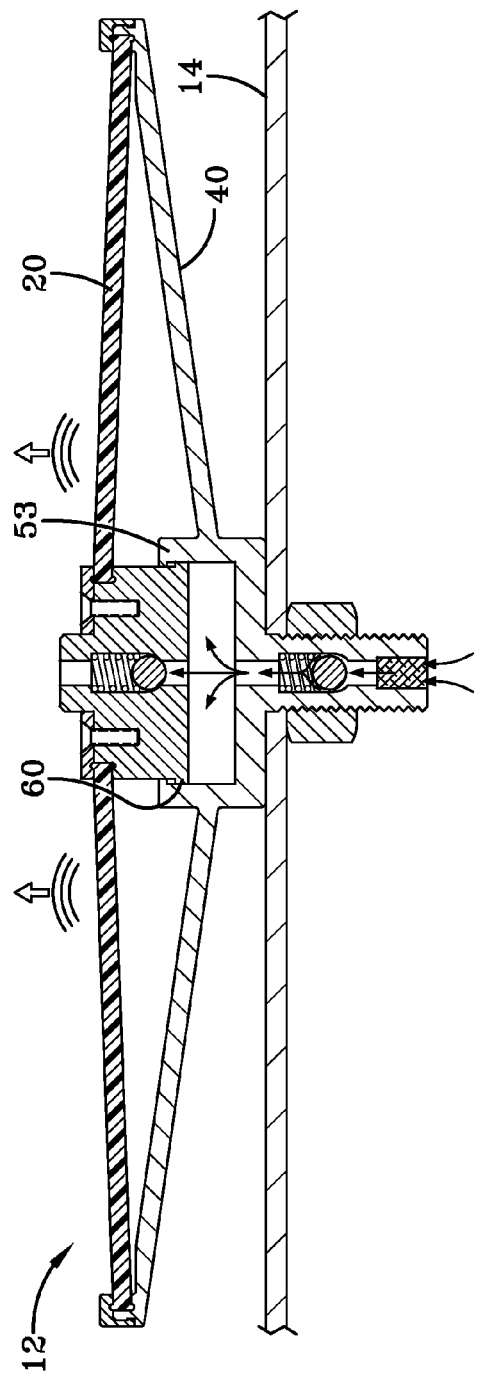

US 8,820,376 B2

DIAPHRAGM PUMP FOR SELF-INFLATING TIRE

FIELD OF THE INVENTION

The invention relates generally to self-inflating tires and, more specifically, to a pump mechanism for such tires.

BACKGROUND OF THE INVENTION

Normal air diffusion reduces tire pressure over time. The natural state of tires is often under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

The invention provides in a first aspect, a self-inflating tire assembly including a tire mounted to a rim tire mounting surface. The tire has an internal cavity. The invention further includes a pump device mounted to the rim, and the pump device has a first end and a second end, the first end being mounted within the tire cavity and the second end located outside the rim and in fluid communication with the outside air. The first end of the pump device has a flexible member having an outer rim and an inner rim, wherein the outer rim is connected to a backing plate and an inner rim is connected to a piston, wherein the piston is slidably mounted within a chamber of the backing plate. The piston has an inner passageway for fluid communication with the tire cavity and the chamber, and the second end of the pump device has an internal bore in fluid communication with the outside air and the chamber.

The invention provides in a second aspect, a pump device for mounting to a tire and rim subassembly, the tire having an internal cavity, the pump device includes a first end and a second end, the first end being mounted within the tire cavity and the second end located outside the rim and in fluid communication with the outside air; the first end of the pump device further having a flexible member having an outer rim and an inner rim, wherein the outer rim is connected to a backing plate and an inner rim is connected to a piston, wherein the piston is slidably mounted within a chamber of the backing plate, wherein the piston has an inner passageway for fluid communication with the tire cavity and the chamber, and the second end of the pump device has an internal bore in fluid communication with the outside air and the chamber.

DEFINITIONS

"Aspect ratio" of the tire means the ratio of its section height (SH) to its section width (SW) multiplied by 100 percent for expression as a percentage.

"Axial" and "axially" means lines or directions that are parallel to the axis of rotation of the tire.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

BRIEF DESCRIPTION OF THE DRAWINGS

The invention will be described by way of example and with reference to the accompanying drawings in which:

FIG. 5a illustrates the diaphragm pump in a closed position and FIG. 5B illustrates the diaphragm pump in the open position.

DETAILED DESCRIPTION OF THE INVENTION

Figure 1:
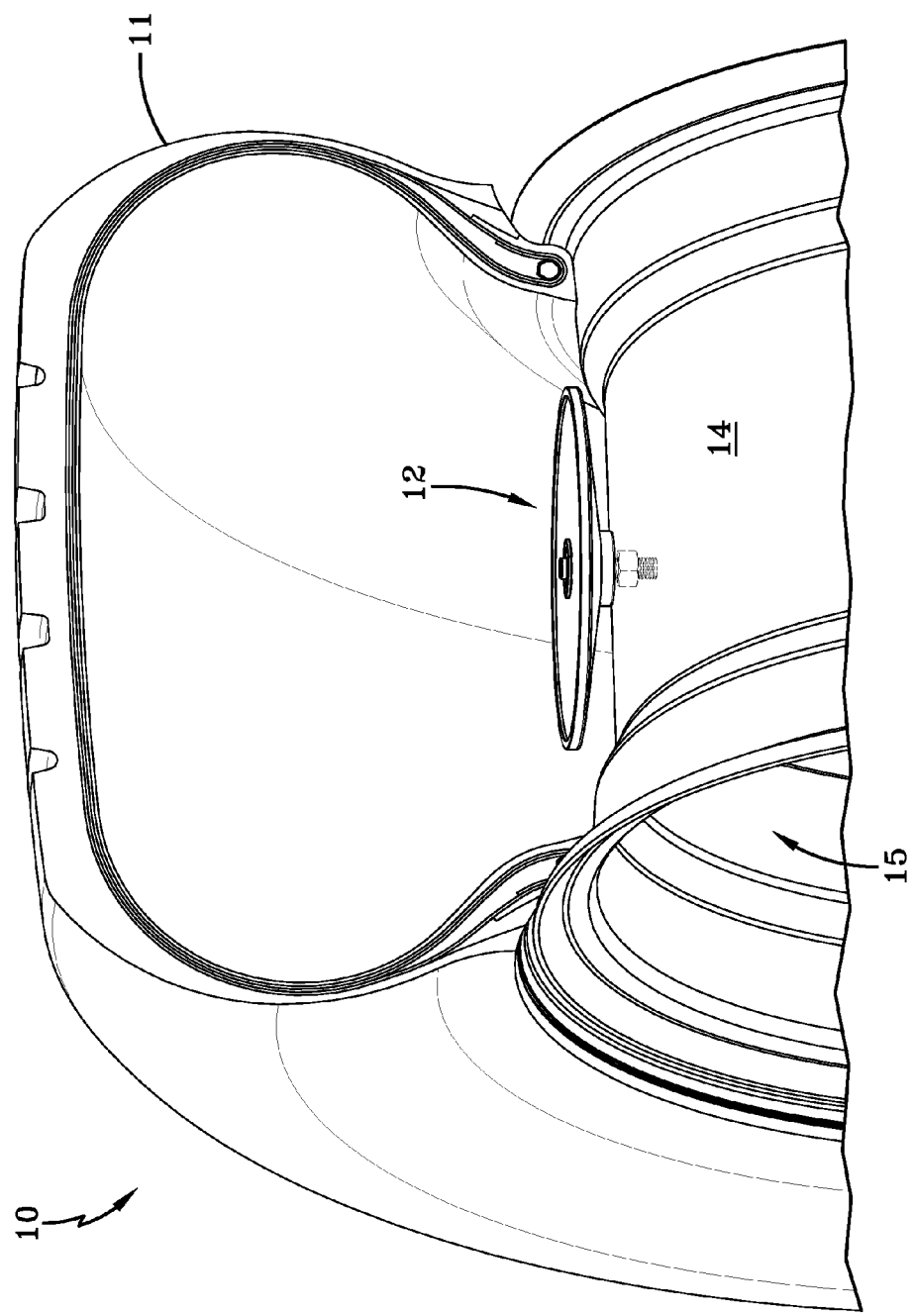
FIG. 1 is an isometric cut-away view of a tire and rim assembly showing a pump of the present invention.
Figure 2:
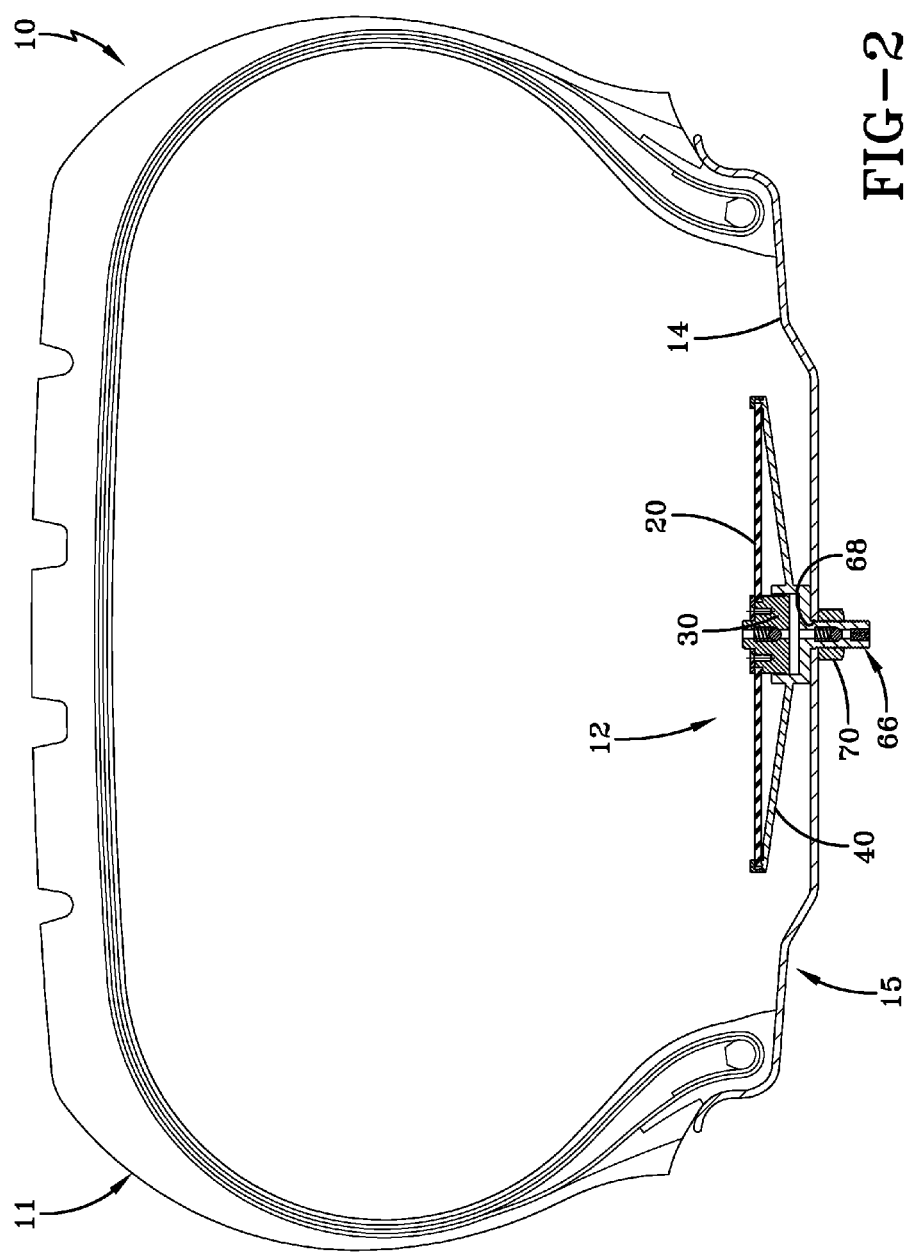
FIG. 2 is a front view of the tire and rim assembly of FIG. 1.
Figure 3:
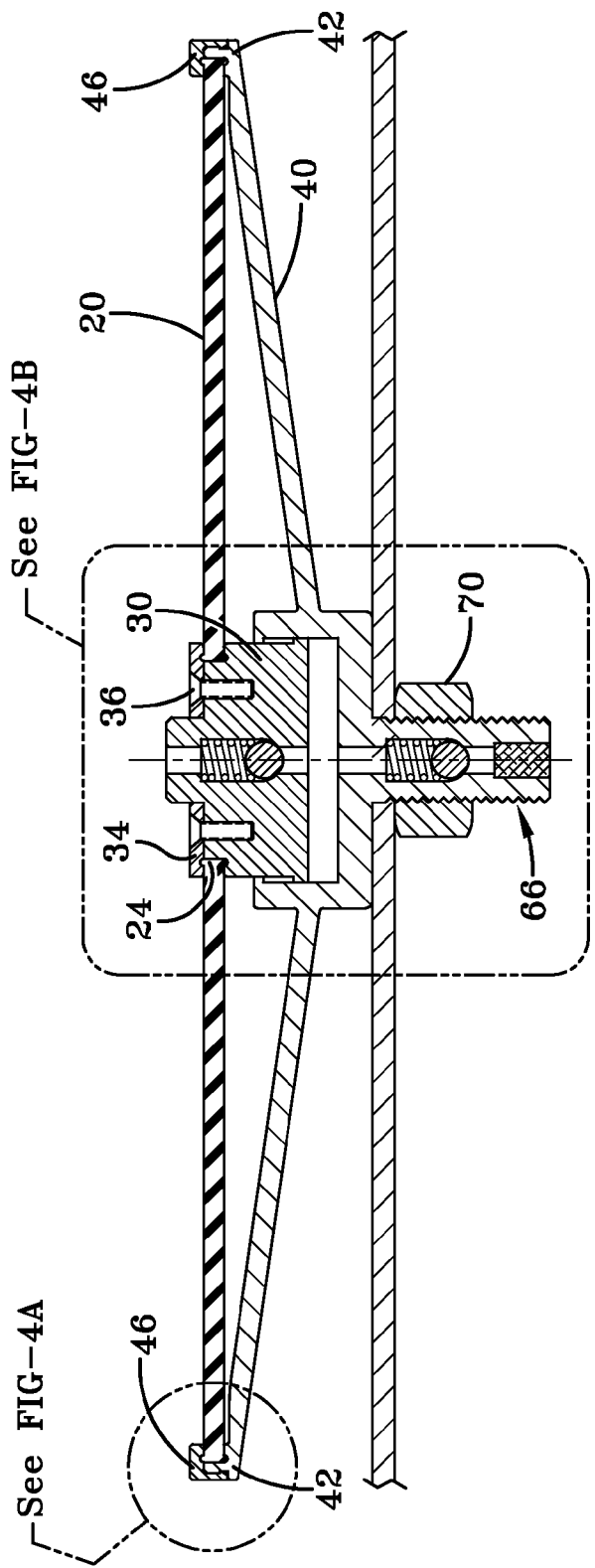
FIG. 3 is an enlarged cross-sectional view of the pump assembly of FIG. 1.

FIG. 1 illustrates a perspective view of a tire and rim assembly 10 wherein a portion of the tire has been removed for clarity. A pump 12 is shown mounted to the outer annular surface 14 of a tire rim and is located within the tire cavity. A cross-sectional view of the tire 11, rim 15 and pump assembly 12 is shown in FIG. 2. The pump assembly 12 has a membrane member 20 that is preferably circular in shape. The membrane member 20 may be formed of rubber or a flexible elastomeric material. The membrane member has a hole 22 for receiving a piston 30 therein. The piston is preferably cylindrically shaped. The membrane member 20 has an inner rim 24 which is removably affixed to piston. The inner rim 24 is received in an annular recessed portion 32 of the piston 30 and is secured to the piston by a cover plate 34. The inner rim 24 of the membrane is seated between the removable cover plate 34 and the annular recessed portion 32 of the piston 30. Screws 36 or other attachment means secure the cover plate to the piston. The outer edge 38 of the membrane member 20 is secured between a flanged end 42 of backing plate 40 and an annular clamp 46. The annular clamp 46 has an L shaped cross-sectional shape, with a first end 48 having a protruding portion forming a lip 47 that is received in a mating groove 49 of the outer annular portion of the flanged end 42 of the backing plate 40. The annular clamp 46 has a second end 51 that clamps or secures the outer edge of the membrane member 20 to the backing plate 40.

The backing plate 40 has a cylindrical chamber 50 that is preferably centrally located having a bore 52 for receiving the piston 30 therein. The piston 30 is actuable within the chamber from a first position to a second position. The piston has an annular stop 60 which contacts the outer rim 53 of the chamber 50 to prevent the piston from escaping the chamber.

Figure 4A:
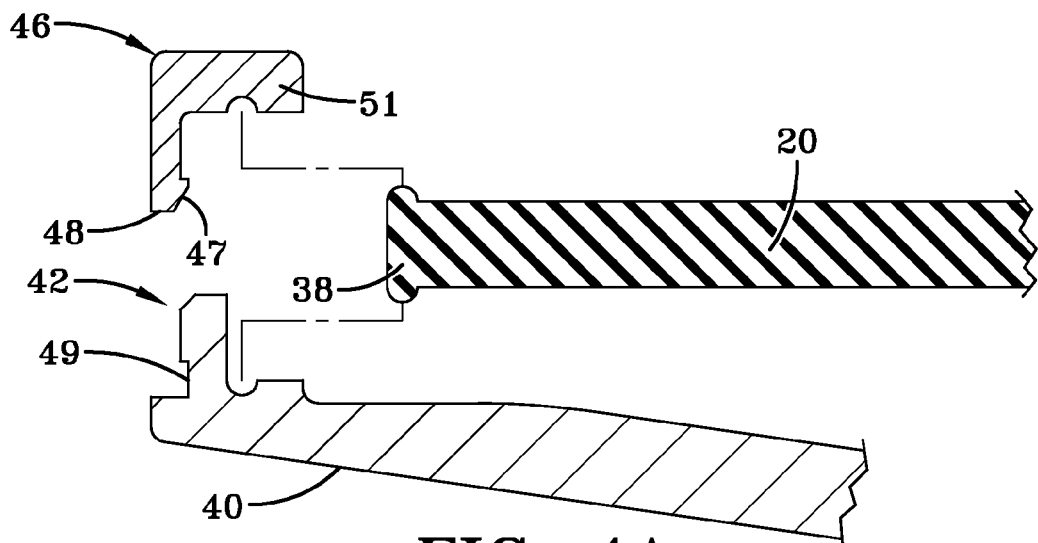
FIG. 4A is a close-up view of the area labeled "4A" shown in FIG. 3.
Figure 4B:
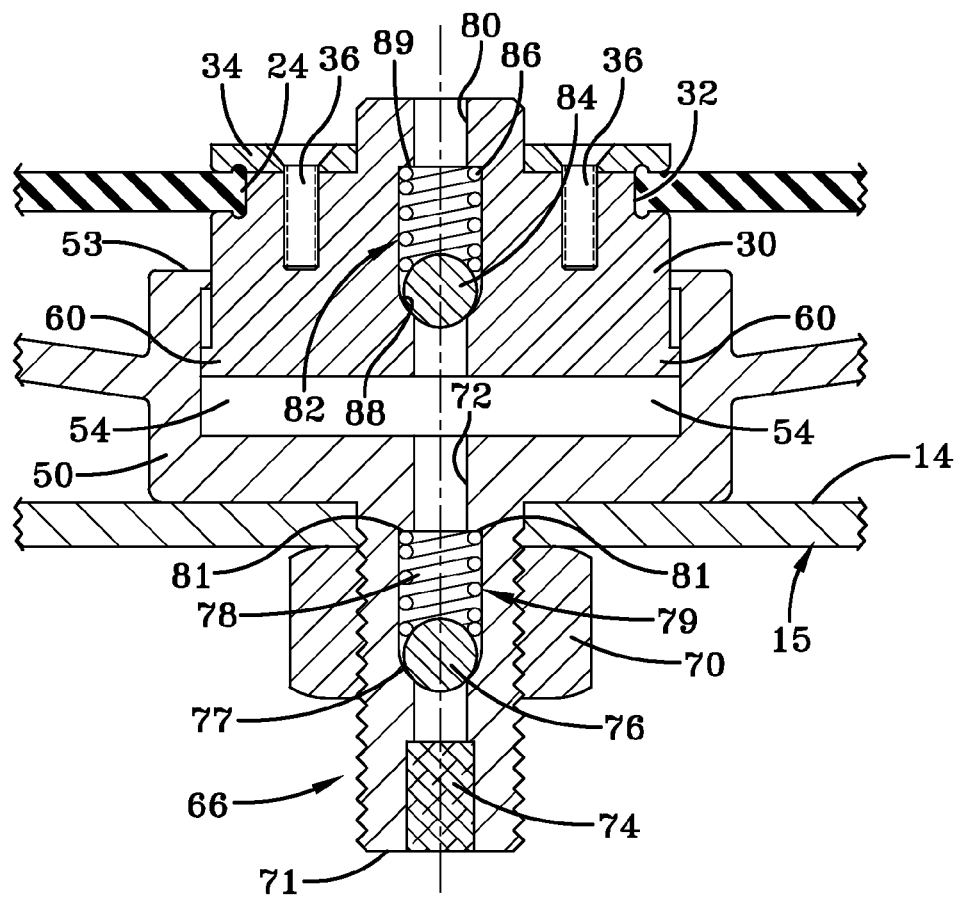
FIG. 4B is a close-up view of the area labeled "4B" shown in FIG. 3.
Figure 6:
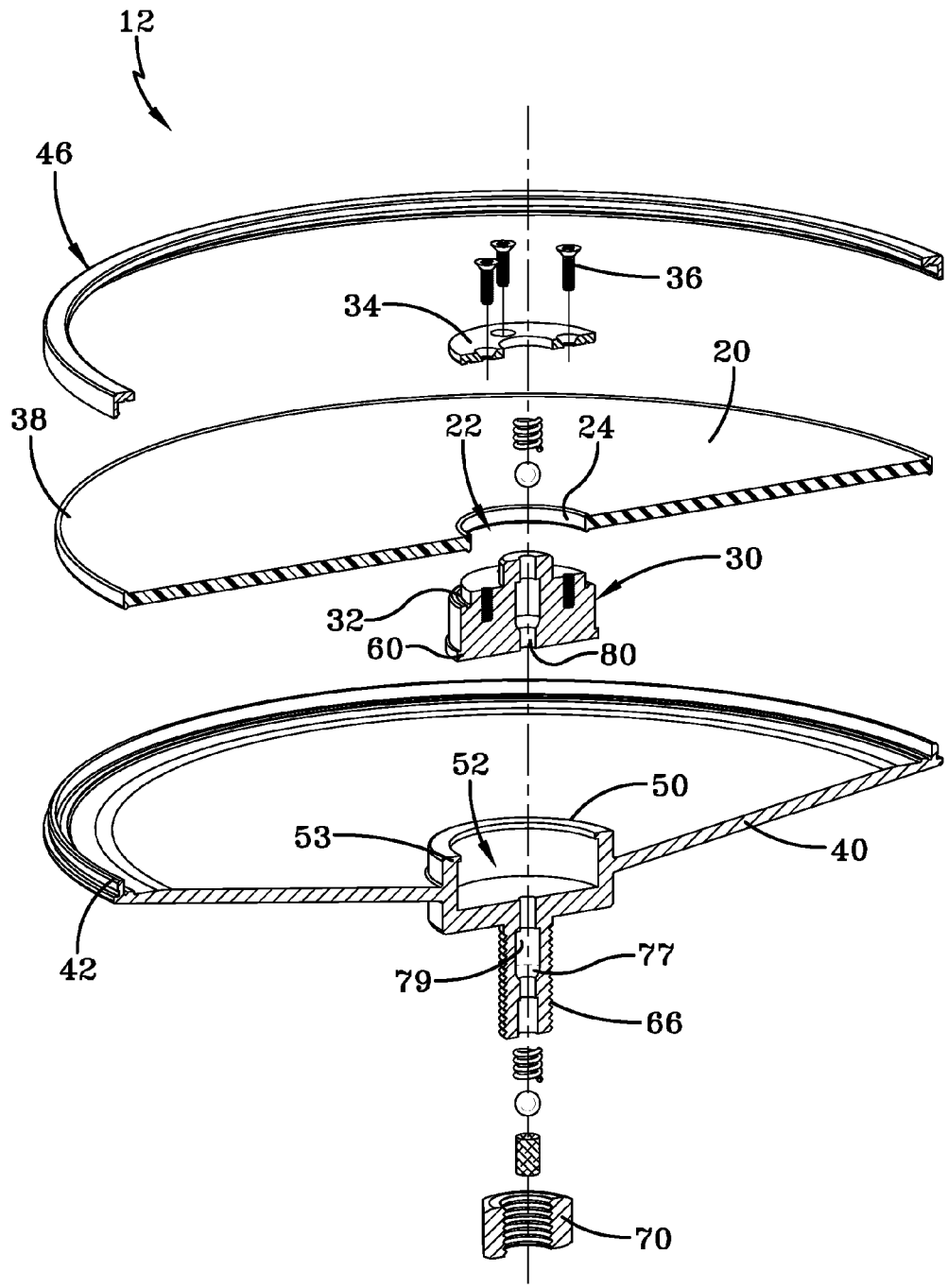
FIG. 6 is an exploded cross-sectional view of the pump assembly.

The pump device 12 is attached to the tire rim surface by inserting a threaded end 66 of the pump device into hole 68 on rim 15 and securing the threaded end to the rim surface with a nut 70. As shown in FIG. 4B, the threaded end 66 of the pump device 12 has an internal bore 72 that extends from an outer distal end 71 through the threaded end and into the interior cavity 54 of the piston chamber 50. The interior bore 72 has an optional filter 74 mounted in the bore near the exit port of the bore 72 for filtering the air entering the bore. The bore further comprises a spring 78 and ball 76. The spring and ball is mounted into a defined cavity 79 having a first end having a sidewall rim 77. The sidewall rim 77 has a reduced cross-sectional area. The defined cavity has a second end having a shoulder portion 81 for retaining the spring within the defined cavity. The spring, ball and defined cavity combination function as a check valve, wherein the spring 78 biases the ball 76 into a closed position against the sidewall rim 77 of the bore 72. The sidewall rim 77 has a reduced cross-sectional area so that when the ball is seated against the sidewall rim, fluid may not flow through the bore 72, as shown in FIG. 4B. The check valve will permit airflow inboard, i.e., from the rim area outside of the tire cavity to the piston cavity through the bore 72 when the pressure inside the cavity 54 of the piston chamber 30 is lowered, pushing the ball upwards and away from the sidewall rim and allowing airflow to flow past the sidewall rim into the bore and into the cavity 54 of the chamber. The cavity pressure is lowered when the piston travels from the bottom of the chamber to the top on its up stroke, as shown in FIG. 5B.

FIG. 5A illustrates the piston in the bottom of the chamber. The piston 30 has an internal bore 80 therethrough, and which is in fluid communication with the cavity 54 formed between the piston and the chamber. The internal bore has a recessed portion 82 for housing a ball 84 and spring 86, and together with the recessed portion functions as a check valve. The recessed portion 82 has an annular lip 88 which has a reduced cross-sectional area which retains the ball and spring within the cavity. When the ball outer surface is in engagement with the annular lip 88, no flow can occur. The recessed portion 82 further includes a stop 89 which retains the ball and spring within the recessed portion and acts as a bearing surface for the spring.

As the piston is lowered from its top position to the bottom of the chamber, air in the cavity 54 is compressed. As the cavity pressure 54 increases, the fluid pressure pushes the ball away from the annular lip 88, allowing the air in the cavity to escape into the tire, as shown in FIG. 5A. The pump device 12 is actuated by the movement of the flexible member 20, which vibrates due to the pressure fluctuations in the tire. The pressure fluctuations are caused by tire cavity resonance. Tire cavity resonance is a well known phenomenon in tires caused by vibration of the air column formed between the tire and rim cavity. Tire cavity resonance features very little damping and reaches sound levels in the area of 160 dB. Tire cavity resonance generates radial force variations exceeding 100 N at frequencies between 210-250 Hz. Equivalent pressures variations are 0.001-0.020 bar. Using an appropriate force or pressure transformation (lever ratio or area), the pressure variation can be used to compress air. Compressing air to 2.0 bar over-pressure will require a membrane/piston cross sectional area ratio of 200:1 to transform a 0.010 bar pressure change into a 2.0 bar over pressure. It is preferred that the membrane/piston area ratio be in the range of about 100 to 300, and more preferably in the range of 150 to 250.

Compression will happen when the membrane is exposed to the high pressure part of the tire cavity resonance oscillation causing the membrane member and the piston to move downward and upward, resulting in the air in the cavity being compressed. The compressed air will be pumped into the tire when the check valve opens in the piston, allowing the airflow to occur.

EXAMPLE 1

A 205/55R16 tire is mounted on a rim and inflated to 2 bar, and has an approximate air volume of 16 liter. If the supposed pressure loss is 0.1 bar/month, the equivalent volume of uncompressed air lost is estimated to be about 0.5 liters as determined, below.

Volume of air at atmospheric pressure×pressure loss/absolute pressure,

16*0.1/(2.0+1.0)=0.5 liter

The determining factor to dimension the pump device is the pressure ratio between the membrane (member 20) and piston cross-sectional area 30. Force variation caused by Tire cavity resonance (TCR) has been measured to range from 20 to 250 N. Equivalent pressure variation is estimated via rim surface normal to force direction=F/A, wherein
The area A=6.0"×16.0"~0.06 $m^2$
Supposing Force variation F=TCR=60 N
The corresponding pressure variation=F/A=60 N/0.06 $m^2$=1000 Pa=10 mbar.
Ratio given by pump pressure to be achieved: ratio=Ppump/PTCR=(2.0+1.0)/0.010=300

If dimensioning the pump to deliver 0.0001 liter/second (uncompressed), then the time to recover 0.5 liter is 5000 seconds or 1.4 hours or a monthly distance of 83 km traveled at a speed of 60 kph.
With approximately 220 pump strokes/second volume per stroke=0.45 $mm^3$
With a supposed membrane stroke of 0.1 mm piston surface becomes 4.5 $mm^2$ which corresponds to a diameter of 2.4 mm
An appropriate membrane diameter to achieve the required surface ratio of 1:300 then becomes 42 mm
Supplemental considerations when dimensioning the pump:
pump volume per time unit is a linear function of the membrane area (the bigger the better)
however pump resonance frequency decreases with increasing membrane and piston dimensions
actual operating conditions (membrane dimensions) should be selected to have the pump work in critical (resonance) conditions where oscillation amplitudes reach a maximum Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
a rim having a tire mounting surface;
a tire mounted to the rim tire mounting surface, the tire having an internal cavity,
a pump device mounted to the rim,
the pump device having a first end and a second end, the first end being mounted within the tire cavity and the second end located outside the rim and in fluid communication with the outside air;
the first end of the pump device further comprising a flexible member having an outer rim and an inner rim, wherein the outer rim is connected to a backing plate and an inner rim is connected to a piston, wherein the piston is slidably mounted within a chamber of the backing plate,
wherein the piston has an inner passageway for fluid communication with the tire cavity and the chamber, and the second end of the pump device has an internal bore in fluid communication with the outside air and the chamber, wherein the second end of the pump device further comprises a check valve mounted within the internal bore.

2. The self-inflating tire assembly of claim 1 wherein the flexible member is annular in shape.

3. The self-inflating tire assembly of claim 1 wherein the flexible member is made of a rubber material.

4. The self-inflating tire assembly of claim 1 wherein the flexible member is made of an elastomeric material.

5. The self-inflating tire assembly of claim 1 wherein the piston further comprises a check valve mounted within the inner passageway.

6. The self-inflating tire assembly of claim 5 wherein the check valve is biased into the closed position.

7. The self-inflating tire assembly of claim 5 wherein the check valve is positioned to prevent air from escaping the cavity.

8. The self-inflating tire assembly of claim 1 wherein the check valve is biased into the closed position.

9. The self-inflating tire assembly of claim 1 wherein the check valve is positioned to prevent air from escaping the chamber.

10. The self-inflating tire assembly of claim 1 wherein the ratio of the cross-sectional area of the flexible member to the cross sectional area of the piston is in the range of 150 to 350.

11. The self-inflating tire assembly of claim 1 wherein the ratio of the cross-sectional area of the flexible member to the cross sectional area of the piston is greater than 200.

12. A pump device for mounting to a tire and rim subassembly, the tire having an internal cavity, the pump device comprising: a first end and a second end, the first end being mounted within the tire cavity and the second end located outside the rim and in fluid communication with the outside air; the first end of the pump device further comprising a flexible member having an outer rim and an inner rim, wherein the outer rim is connected to a backing plate and an inner rim is connected to a piston, wherein the piston is slidably mounted within a chamber of the backing plate, wherein the piston has an inner passageway for fluid communication with the tire cavity and the chamber, and the second end of the pump device has an internal bore in fluid communication with the outside air and the chamber, wherein the ratio of the cross-sectional area of the flexible member to the cross sectional area of the piston is in the range of 150 to 350.

13. A pump device for mounting to a tire and rim subassembly, the tire having an internal cavity, the pump device comprising: a first end and a second end, the first end being mounted within the tire cavity and the second end located outside the rim and in fluid communication with the outside air; the first end of the pump device further comprising a flexible member having an outer rim and an inner rim, wherein the outer rim is connected to a backing plate and an inner rim is connected to a piston, wherein the piston is slidably mounted within a chamber of the backing plate, wherein the piston has an inner passageway for fluid communication with the tire cavity and the chamber, and the second end of the pump device has an internal bore in fluid communication with the outside air and the chamber, wherein the ratio of the cross-sectional area of the flexible member to the cross sectional area of the piston is greater than 200.

* * * * *